Figure 1:
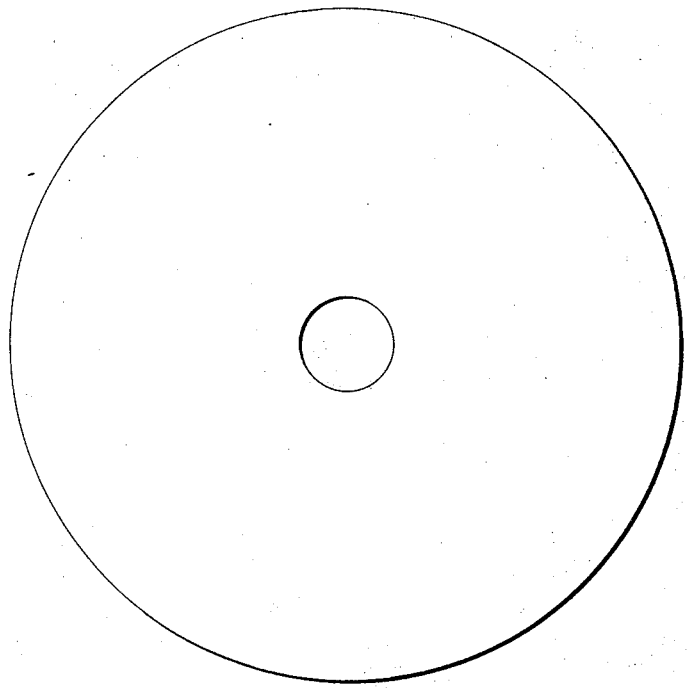
Figure 2:
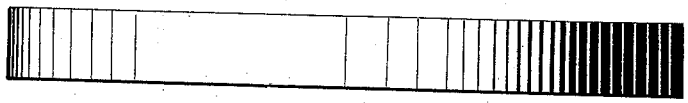

G. E. Vanderburgh,
Emery Wheel.

Nº 34,123. Patented Jan. 7, 1862.

Witnesses:
Randolph Coys Jr.
F. W. Symons.

Inventor:
Geo. E. Vanderburgh
By his Attorney
J. C. Robbins

UNITED STATES PATENT OFFICE.

GEORGE E. VAN DERBURGH, OF MAMARONECK, ASSIGNOR TO THE LIQUID QUARTZ COMPANY, OF NEW YORK, N. Y.

IMPROVEMENT IN FORMING EMERY-WHEELS AND GRINDING-SURFACES.

Specification forming part of Letters Patent No. 34,123, dated January 7, 1862.

*To all whom it may concern:*

Be it known that I, GEORGE E. VAN DERBURGH, of Mamaroneck, in the county of Westchester and State of New York, have invented a Method of Producing Artificial Stone Suitable for Grinding and for other Purposes; and I do hereby declare that the following is a full and exact description of the same.

My said invention consists, first, in employing a peculiar character of liquid silicate as the cementing material for uniting various comminuted gritty and cutting substances into articles of artificial stone—viz., a liquid silicate that has been or may be produced by carrying out the formula set forth in the patent which issued May 29, 1860, to myself as assignor to the New York Liquid Quartz Company; second, after any properly-prepared gritty or cutting substance has been incorporated with such a proportion of the above-mentioned liquid silicate as to produce a pasty substance, my invention consists, furthermore, in placing the said pasty substance in molds of any desired shape and subjecting them to the desired degree of hardening pressure.

My invention furthermore consists in subjecting the aforesaid molded articles of gritty paste to a curing and toughening process of treatment, viz: first subjecting them to the action of a moderate degree of heat for the purpose of drying the same, and then subjecting the said articles to the action of a higher temperature by the aid of a sand bath or some other analogous heating apparatus.

The following are some of the gritty and cutting substances that I propose to employ in the production of artificial cutting and grinding surfaces, viz: emery, corundum, franklinite, and glass in a suitably comminuted state; also, sand, fragments of burr-stone, &c.; and the articles which I propose to produce are emery-wheels and also emery blocks of any desired shape, corundum wheels and corundum blocks, franklinite wheels and blocks, glass wheels and surfaces, sand wheels, blocks, and surfaces, grindstones, millstones, &c.

I provide the above-mentioned articles in the following manner, viz: The properly-prepared gritty or cutting materials employed in said process are first incorporated with such a proportion of the aforesaid liquid silicate as will produce a pasty substance, and this substance is put into the desired shape by molding and pressure. Then the said molded articles are first thoroughly dried while exposed to a comparatively low temperature, and then they are exposed to a curing or toughening temperature, which must not be high enough to impair the cutting properties of the gritty portion of the said articles; and in this connection I would observe that I have myself produced the best results by employing a sand bath as the medium of communicating the proper degree of curing and toughening heat to the said molded articles.

What I claim as my invention, and desire to secure by Letters Patent, is—

1. Employing the liquid silicate which is referred to in the body of this specification as the cementing material in the process of producing articles of artificial stone suitable for cutting, grinding, and other purposes.

2. After any properly-prepared gritty or cutting substance has been incorporated with such a proportion of the above-mentioned liquid silicate as will produce a pasty substance, the putting of said pasty substance into any desired shape by molding and pressure.

3. The curing and toughening of the said molded articles of gritty paste by first subjecting them to the action of a moderate degree of heat for the purpose of drying the same, and then subjecting the said articles to the action of a higher temperature by the aid of a sand bath or some other analogous heating apparatus.

GEORGE E. VAN DERBURGH.

Witnesses:
WM. L. BARKER,
CHARLES DRAKE.